(12) United States Patent
Ravasi

(10) Patent No.: US 11,249,207 B2
(45) Date of Patent: Feb. 15, 2022

(54) METHOD OF REDATUMING GEOPHYSICAL DATA

(71) Applicant: Equinor Energy AS, Stavanger (NO)

(72) Inventor: Matteo Ravasi, Sandsli (NO)

(73) Assignee: EQUINOR ENERGY AS, Stavanger (NO)

( * ) Notice: Subject to any disclaimer, the term of this patent is extended or adjusted under 35 U.S.C. 154(b) by 198 days.

(21) Appl. No.: 16/084,660

(22) PCT Filed: Mar. 15, 2017

(86) PCT No.: PCT/NO2017/050068
§ 371 (c)(1),
(2) Date: Sep. 13, 2018

(87) PCT Pub. No.: WO2017/160162
PCT Pub. Date: Sep. 21, 2017

(65) Prior Publication Data
US 2019/0101659 A1 Apr. 4, 2019

(30) Foreign Application Priority Data
Mar. 16, 2016 (GB) ..................................... 1604480

(51) Int. Cl.
*G01V 1/00* (2006.01)
*G01V 1/36* (2006.01)
*G01V 1/30* (2006.01)
*G01V 99/00* (2009.01)

(52) U.S. Cl.
CPC .............. *G01V 1/003* (2013.01); *G01V 1/308* (2013.01); *G01V 1/362* (2013.01); *G01V 99/005* (2013.01); *G01V 2210/169* (2013.01); *G01V 2210/25* (2013.01); *G01V 2210/53* (2013.01); *G01V 2210/66* (2013.01); *G01V 2210/675* (2013.01)

(58) Field of Classification Search
CPC ........ G01V 1/003; G01V 1/362; G01V 1/308; G01V 99/005; G01V 2210/53; G01V 2210/25; G01V 2210/169; G01V 2210/66; G01V 2210/675; G01V 1/28; G01V 11/00
See application file for complete search history.

(56) References Cited

U.S. PATENT DOCUMENTS

2010/0074051 A1* 3/2010 Halliday .................. G01V 1/28
367/43
2011/0082646 A1 4/2011 Halliday et al.
(Continued)

FOREIGN PATENT DOCUMENTS

WO 2015082419 A1 6/2015

OTHER PUBLICATIONS

L. Amundsen, "Elimination of Free Surface-related Multiples Without Need of the Source Wavelet", 1999 SEG Annual Meeting, Oct. 31-Nov. 5, Houston, Texas, 4 pages.*
(Continued)

*Primary Examiner* — Alexander Satanovsky
(74) *Attorney, Agent, or Firm* — Eversheds Sutherland (US) LLP

(57) ABSTRACT

A method of redatuming geophysical data, wherein there is provided multi-component geophysical data, and the method includes obtaining at least one focussing function and/or at least one Green's function from the multi-component geophysical data.

5 Claims, 5 Drawing Sheets a)

b)

(56) References Cited

U.S. PATENT DOCUMENTS

| | | | | |
|---|---|---|---|---|
| 2013/0301387 | A1* | 11/2013 | van Groenestijn | G01V 1/36 367/46 |
| 2015/0046093 | A1* | 2/2015 | Pires De Vasconcelos | G01V 1/345 702/16 |
| 2015/0109881 | A1* | 4/2015 | Poole | G01V 1/364 367/7 |
| 2016/0238722 | A1* | 8/2016 | Vdovina | G01V 1/368 |
| 2016/0356903 | A1* | 12/2016 | Akcelik | G01V 1/282 |

OTHER PUBLICATIONS

Liu et al. "Combination of surface and borehole seismic data for robust target-oriented imaging", Geophys. J. Int. (2016) 205, 758-775.*

Amundsen, L., Elimination of free-surface related multiples without need of the source wavelet, Geophysics, vol. 66, No. 1 (Jan.-Feb. 2001), pp. 327-341 (15 pp.).

International Search Report and Written Opinion, PCT/NO2017/050068, dated Jun. 1, 2017 (10 pp.).

GB1604480.2 Search Report, dated Jul. 7, 2016 (3 pp.).

Liu, Yi, Data-driven deep local imaging using both surface and borehole seismic data, CrossMark, SEG New Orleans Annual Meeting, pp. 5554-5559, 2015 (6 pp.).

Ravasi, M., et al., Target-oriented Marchenko imaging of a North Sea field, Geophysical Journal Internationals, pp. 99-104, 2016 (6 pp.).

Singh, S., et al., Marchenko imaging: Imaging with primaries, internal multiples, and free-surface multiples, Geophysics, vol. 80, No. 5, pp. S165-S174, Sep.-Oct. 2015 (10 pp.).

Van Der Neut, et al., Internal multiple suppression by adaptive Marchenko redatuming, CrossMark, SEG Denver 2014 Annual Meeting, pp. 4055-4059, 2014 (5 pp.).

Van Der Neut, et al., Inversion of the Multidimensional Marchenko Equation, IFEMA Madrid, Jun. 1-4, 2015 (5 pp.).

Van Der Neut, et al., On Green's function retrieval by iterative substitution of the coupled Marchenko equations, Geophysical Journal International, pp. 792-813, 2015 (22 pp.).

Van Der Neut, et al., Practical challenges in adaptive Marchenko imaging, Delft University of Technology, date unknown (5 pp.).

Wapenaar, K., et al., On the Marchenko equation for multicomponent single-sided reflection data, Geophysical Journal International, pp. 1367-1372, 2014 (5 pp.).

Wapenaar, K., et al., Marchenko imaging, Geophysics, vol. 79, No. 3, pp. WA39-WA57, May-Jun. 2014 (19 pp.).

* cited by examiner a)    b)

a)    b)    c)

METHOD OF REDATUMING GEOPHYSICAL DATA

TECHNICAL FIELD

The present invention relates to a method of redatuming geophysical data.

BACKGROUND OF THE INVENTION

The process of obtaining seismic wavefield propagators emanating from a subsurface using data acquired at an acquisition surface is called redatuming by the geophysical community. Since recovering such wavefields is equivalent to creating a virtual source firing in the subsurface and receivers recording its echo at the Earth's surface (or equivalently firing sources at the Earth's surface and having a receiver in the subsurface), this is a basic requirement for almost any imaging and inversion technique used in the oil and gas business.

Common approaches to redatuming of seismic data are based on the concept of time-reversal of data recorded along an open boundary of surface receivers (Berryhill, 1984) and generally fail to explain how multiple reverberations propagate in the complex subsurface, unless high-resolution seismic velocity models are available prior to imaging. Until very recently this has required seismologists to heavily process seismic data to remove unwanted effects (e.g., multiples) that could not be handled by standard redatuming techniques.

Marchenko redatuming is a revolutionary technique to estimate more accurate wavefield propagators, which are as such Green's functions (i.e., full wavefield responses that contain multiple reverberations with correct amplitudes) from virtual sources in the subsurface using data measured at the Earth's surface. Moreover, this technique is mostly data-driven as it simply requires a background velocity model (i.e., without detailed structure) as unique model-type information. Such a goal is achieved by crafting special wavefields (so-called focussing functions) that can focus energy at a chosen point in the subsurface.

Stated differently, Marchenko redatuming enables a calculation of focussing functions and Green's functions for a geophysical structure from real recorded reflection seismic data from that geophysical structure. The focussing functions and/or Green's functions can then be used during imaging or inversion.

In this field a set of exact equations has been proposed in (see Broggini et al., 2012; Wapenaar et al., 2014a; and van der Neut et al., 2015a) in order to handle a specific type of multiples, so-called internal multiples, and create more accurate subsurface wavefields, which lead to better images of the subsurface. It is also known for the Marchenko equations to have been modified to account for free-surface multiples (i.e., effect of water column) as well (see Singh et al. (2015)).

However, in order to obtain improvements in accuracy of wavefield propagators, Marchenko redatuming has to pay a price. This price is extremely strict requirements on the reflection seismic data compared to more standard redatuming techniques.

Thus, despite its enormous potential, these strict requirements on the reflection seismic data have challenged the application of Marchenko redatuming to real scenarios (Ravasi et al. 2015). The main problem of the existing Marchenko technique lies in the fact that the proposed equations used for redatuming are valid only in a highly idealised scenario with the very strict requirements. The idealised scenario requires:

1. equal numbers of seismic sources and receivers;
2. the depths and lateral positions of all sources and receivers to be the same;
3. regular acquisition geometry of both sources and receivers;
4. seismic sources to be only fired sequentially and not simultaneously;
5. an accurate estimate of the source wavelet;
6. the effect of the source wavelet to be accounted for (by removing the effect of the source wavelet on the recorded data prior to redatuming); and
7. the effect of the free-surface to be accounted for (either removed from the data as in Broggini et al., 2012; Wapenaar et al., 2014a), or kept in the data but a ghost model is has to be provided (Singh et al., 2015).

Most of these requirements are in reality impossible to meet in the process of acquiring seismic data. Thus, acquired data is typically processed prior to performing the Marchenko method to attempt to ensure the data meets the above criteria (i.e. it is pre-processed prior to use in the Marchenko method so as to transfer the acquired data from the real, physical acquisition scenario to the idealised scenario). However, this processing is costly, and approximations/errors are made which will prevent the data from being in the ideal scenario, and hence prevent the existing Marchenko method from properly redatuming the data.

Wapenaar et al. 2014b teaches an extension of the original Marchenko equations for the elastic wave equation. However, this elastic formulation of the original Marchenko equations still has the very strict requirements discussed above. Indeed, as a further requirement, Wapenaar et al. 2014b requires the use of the whole elastic field as data for the redatuming method taught therein.

Van der Neut et al. 2014 teaches another example of Marchenko redatuming. Again, the method used here relies on the very strict requirements discussed above being met.

Liu et al. 2015 teaches using the output of Marchenko redatuming for imaging purposes. It does not address any of the issues relating to the strict requirements necessary for Marchenko redatuming discussed above.

In this field, it is important to distinguish between a real acquisition scenario and an ideal acquisition scenario. The former is what physically occurs in the field when data is acquired. It does not allow sources and receivers to be in the same place, and it can contain a free surface (e.g., sea surface) above the sources and receivers. The ideal scenario is the one that is required for the original Marchenko method to work without any pre-processing. It comprises a medium without a sea surface (e.g. an infinite homogenous medium above the sources) and allows sources and receivers to be in the same place (since it is ideal it does not matter if this is not physically possible). To move from the real to the ideal scenario data is processed such that a processed version of the data mimics the ideal scenario. Of course, this processing is not perfect and introduces inaccuracies which impact on the original Marchenko method.

SUMMARY OF THE INVENTION

The present invention relieves these strict requirements, which allows the present redatuming to be much more robust in view of the somewhat inevitable physical constraints associated with geophysical data acquisition. Further, it reduces or even eliminates the need for the pre-processing of converting real data to a more idealised scenario.

In one aspect, the invention provides a method of redatuming geophysical data, wherein there is provided multi-component geophysical data, and the method comprises: obtaining at least one focussing function and/or at least one Green's function from the multi-component geophysical data.

The inventor has discovered a new method of calculating focussing functions and/or Green's functions, which are of use when redatuming geophysical data and hence generating images of a geophysical structure, such as the Earth's crust and/or sediment layer. Unlike the prior art discussed above, the method devised by the inventor does not require as strict an acquisition set-up for measuring the raw geophysical data, to ensure it is suitable for use in obtaining focussing functions and/or Green's functions. Further, unlike the prior art discussed above, the method devised by the inventor does not require substantial pre-processing of the geophysical data (e.g. pre-processing to convert the geophysical data from the real situation to a highly-idealised situation), to ensure it is suitable for use in obtaining focussing functions and/or Green's functions. Instead, the present method can work for the real scenario, or at the very least a less-idealised scenario. In order to achieve these advantages, the inventor discovered that all that is required is for the geophysical data used to obtain the focussing function(s) and/or Green's function(s) is for it be multi-component geophysical data. By using multi-component geophysical data, the inventor has discovered a method that alleviates many of the strict requirements of the known method discussed above.

Like the existing Marchenko method, the present method can handle multiple reverberations without having a detailed model of the subsurface. However, as is mentioned above, the present method requires much less pre-processing of the geophysical data in comparison to the existing Marchenko method (e.g. in order to convert the real data to idealised data). Thus, the present method can be thought of as a simpler and more efficient way of calculating focussing function(s) and/or Green's function(s) for use in redatuming geophysical data, and hence for use in imaging. It is more efficient as it requires much less pre-processing and/or many fewer inputs into the calculation and/or many fewer restrictions on acquisition set-up. Since much less pre-processing of geophysical data is required, the method may therefore be thought of as a more direct way of redatuming geophysical data from raw geophysical data.

Further, the method may also naturally apply source deblending as part of the redatuming step. Further still, the present method allows all types of order of multiples to be handled.

The geophysical data used in the present invention may be almost raw data. For instance, it may be "more raw" than the data used in the existing Marchenko method, as there is a reduced need to pre-process the data to transform the data from the real acquisition scenario to an idealised modelled scenario. However, some trivial pre-processing may still occur, such as noise reduction or data resorting. Further, it may be up/down-separated.

The focussing function(s) and/or Green's function(s) may be obtained directly from the multi-component geophysical data (optionally with only minimal pre-processing, as mentioned above).

Alternatively, the focussing function(s) and/or Green's function(s) may be obtained directly from up/down-separated data, separated from the multi-component data. Other than the up/down-separation, there may be no (non trivial) processing of the data.

Here, "directly" is intended to mean that there is no requirement for any (additional) processing to the data when using it to calculate the focussing function(s) and/or Green's function(s). Such processing that is not required by the present method may be, for example, accounting for a source wavelet signature, accounting for free-surface multiples, accounting for depth difference in sources and receivers, or transferring the data from the real scenario to an idealised scenario. These processing steps are required by the known methods discussed above. Of course, by "direct" it is not intended to exclude arbitrary/trivial processing steps that do not actually substantially alter the data (such as arbitrarily multiplying the data by a constant value so as to attempt to avoid the scope of the present invention, excluding/selecting portions of the geophysical data (e.g. via "windowing"), or any trivial processing step such as denoising); rather "direct" is meant to exclude processing steps that require significant processing power to alter the data.

The at least one focussing function and/or the at least one Green's function may be at least one focussing function and/or at least one Green's function for a point located in a geophysical structure, such as a subsurface. The point may be described as a focal point or focussing location.

The at least one focussing function may comprise an upgoing and a downgoing focussing function for a given focussing location. Respective upgoing and downgoing focussing functions may be obtained for a plurality of focussing locations.

The at least one Green's function may comprise an upgoing and a downgoing Green's function for a given focussing location. Respective upgoing and downgoing Green's functions may be obtained for a plurality of focussing locations.

The method may comprise obtaining a plurality of focussing functions and/or a plurality of Green's functions from the multi-component geophysical data. There may be a plurality of focussing functions and/or the plurality of Green's functions for a (or each) given focussing location. However, preferably there may be one focussing function (which may itself comprise an upgoing and downgoing focussing function) and one Green's function calculated for each of a plurality of respective focussing location.

The method may comprise using the focussing function(s) and/or Green's function(s) to redatum the geophysical data. Here the geophysical data may be the multi-component geophysical data or the up/down-separated geophysical data.

As is known from the conventional Marchenko method discussed above, a focussing function is a theoretical function that, if it were injected into a model of a geophysical structure it would focus all the energy of the wavefield at a particular location (the focussing location). The focussing function(s) of the present method may be substantially identical to the focussing function(s) of the conventional Marchenko method (if both methods were performed using the same geophysical structure and geophysical data—despite being pre-processed differently).

Thus, a focussing function may be thought of as a function that focuses a specified wavefield to a focussing location in a geophysical structure. It has been shown in the prior art that focussing functions can be directly related to Green's functions and can be found from geophysical reflection data by using the Marchenko equations, as mentioned above. The term "focussing function" therefore has a well-defined meaning in the art.

As is known from the conventional Marchenko method discussed above, a Green's function is the response of a geophysical structure to a virtual source at a location (the focussing location) within the geophysical structure. It is extremely useful during geophysical imaging or inversion to use virtual source(s) at specific location(s) geophysical structure. Both the previous Marchenko method discussed above and the present method can calculate such Green's functions from real reflection data. The term "Green's function" has a well-defined meaning in the art. However, the specific Green's function calculated using the present method may be different to the specific Green's function calculated using the conventional Marchenko method.

Unlike the Marchenko method, the present method (i.e. using the multi-component geophysical data, preferably directly) can calculate the actual Green's function. By "actual" here it is meant the actual response of the geophysical structure in the real, physical acquisition set-up if a source were provided at the focussing location. In the conventional Marchenko method it is not the actual response that is calculated, but merely a Green's function in the ideal scenario. It is advantageous that the present method returns the actual Green's function as it can be used, for example, to run localised full waveform inversion. However, it is also disadvantageous for imaging because the actual Green's function comprises more events. Because of this when imaging it is preferable to use the focussing function(s) rather than the Green's function(s).

By "focussing location" it is meant the location at which the virtual source is to be located in the geophysical structure. Completely equivalently to the Marchenko method discussed above, finding the Green's function and the focussing function(s) for a virtual source at the focussing location is a key component for any imaging and inversion method.

Thus, the Green's function(s) and/or the focussing function(s) of the present method may be for a given focussing location within the geophysical structure, and preferably for given recorded geophysical data from the geophysical structure. The method may be repeated for a plurality of focussing locations to find Green's function(s) and/or focussing function(s) for each focussing location, but preferably for the same geophysical data. The multiple locations may preferably be located on a subsurface of interest (e.g. a boundary in the geophysical structure). The Green's functions and/or focussing functions for all the locations may be used during imaging/inversion.

The Green's function(s) may comprise an upgoing Green's function and/or a downgoing Green's function for a given focussing location, or for each given focussing location. The focussing function(s) may comprise an upgoing focussing function and/or a downgoing focussing function for a given focussing location, or for each given focussing location.

The method may use a background velocity model in combination with the multicomponent geophysical data. Such a velocity model is commonly required by any other redatuming/imaging scheme, and an example is discussed below in relation to the Figures.

The multicomponent geophysical data may be multicomponent ultrasound data or EM (electromagnetic) data. However, the multi-component geophysical data may preferably be multi-component seismic data. The multi-component geophysical data may comprise as at least one of its components pressure data. The multi-component geophysical data may comprise as at least one of its components particle velocity data, preferably vertical particle velocity data. The multi-component geophysical data may comprise pressure data and particle velocity data, preferably vertical particle velocity data. This data may be known as dual sensor data.

The multi-component geophysical data may consist of pressure data and particle velocity data, preferably vertical particle velocity data. The multicomponent data may not be the entire elastic field.

Using pressure and particle velocity data is different to Wapenaar et al. 2014b. Whilst Wapenaar et al. 2014b mentions using "multi-component" data, the term "multi-component data" used in Wapenaar et al. 2014b is used to refer to the whole elastic field. This is because the method of Wapenaar et al. 2014b uses an elastic model and the elastic wave equation: it essentially teaches an extension of the original Marchenko methods to an elastic formulation.

The present method on the other hand is not aimed at extending the original Marchenko methods to an elastic formulation. Rather, it is aimed at reducing the need for the strict requirements that makes the original Marchenko method difficult/impossible to implement in practice. The present method may make us of an acoustic model, and not an elastic model like Wapenaar et al 2014b (i.e. the present method may be performed in an acoustic setting for acoustic data, i.e. it uses the acoustic wave equation and not the elastic wave equation). The "multi-component" data of the present method may therefore be different to the "multi-component" data mentioned in Wapenaar et al. 2014b. Unlike Wapenaar et al. 2014b, there is no need for the multi-component data used by the present method to be the whole elastic field.

In the existing Marchenko method discussed above, multi-component data is not used as it not required by or compatible with the existing Marchenko equations (equations 1-5 below).

The provided multi-component geophysical data may be raw geophysical data, i.e. it is geophysical data that has had substantially no (non trivial) processing performed on it after its acquisition. This reduces the processing required by the present method, and so saves time and improves efficiency when performing the present method.

However, preferably the provided multi-component geophysical data may also be separated prior to being used in the calculation of the focussing function and/or Green's function. In this case, the data may be considered to be "almost raw", i.e. it is raw other than having been up/down separated (and possibly having been processed by any trivial processing technique, such as data resorting, acquisition noise removal, selective muting, etc.). Data that has been processed to transfer it from the real acquisition scenario to an idealised scenario would not be almost raw—it would be heavily processed.

Thus, the up/down-separation of the raw data may be the only (non trivial) processing performed prior to calculating the focussing and/or Green's function(s).

For instance, as is discussed above a trivial processing step may be one that does not substantially alter the multi-component geophysical data (such as arbitrarily multiplying the geophysical data by a constant value so as to attempt to avoid the scope of the present invention, excluding/selecting portions of the geophysical data (e.g. via "windowing", see below), reducing the noise, or any trivial processing step); rather "non trivial" may be interpreted as any processing step(s) that require significant processing power to alter the geophysical data, such as accounting for the source wavelet or a free-surface, deblending simultaneous sources, or transferring the data from the real acquisition scenario to an idealised scenario.

Thus, the method may also comprise obtaining the multi-component geophysical data. This may be obtained by acquiring raw multi-component geophysical data without any (non trivial) processing step. Alternatively, the multi-component geophysical data may be up/down-separated. Preferably, this up/down-separation may be the only non-trivial processing performed prior to calculating the focussing and/or Green's function(s). The skilled person is aware of numerous suitable up/down-separation techniques.

Preferably, the provided multi-component geophysical data has not been processed to account for a source wavelet. As is discussed above, the known methods require a highly accurate estimate of the source wavelet to be used to process raw acquired geophysical data before it can be used to calculate focussing functions and/or Green's functions. However, the present method does not require an estimate of the source wavelet to be used. This is of great benefit as it can be very difficult to accurately estimate the source wavelet/signature.

Thus, the method may also comprise obtaining multi-component geophysical data from acquired multicomponent geophysical data without processing (or ever having processed) the acquired multicomponent geophysical data to account for the source wavelet-signature.

Thus, since the provided/obtained multi-component geophysical data may be provided/obtained without having been processed to account for a source wavelet, and since the method may obtain the focussing function(s) and/or Green's function(s) directly from the provided/obtained (optionally separated) multi-component geophysical data, the focussing function(s) and/or Green's function(s) may be obtained without processing the data to account for a source wavelet. The present method can account for the source wavelet without having to process the geophysical data to account for the source wavelet.

Whilst the theory is set out in detail below, qualitatively speaking, it can be appreciated that the reason why the geophysical data need not be processed to account for the source wavelet is because the upgoing and downgoing geophysical data originates from the same source. Thus, both are shaped by the same wavelet. Because both are used during redatuming, the source wavelet may be taken care of without have any knowledge of the source wavelet itself.

Preferably, the provided multi-component geophysical data has not been processed to account for free surface multiples. As is discussed above, the existing Marchenko methods require the raw acquired geophysical data to have been processed to account for free surface multiples/ghosts before it can be used to calculate focussing functions and/or Green's functions.

However, the present method does not require free surface multiples to be accounted for in such a way. This is of great benefit as it saves processing time and costs. As is mentioned above, one known Marchenko method can handle multiples, but this requires a ghost model (i.e. accurate knowledge of water column and sea surface properties as well as source/receiver positioning), which is not required by the present method.

Thus, the method may also comprise obtaining multi-component geophysical data from acquired multicomponent geophysical data without processing (or ever having processed) the acquired geophysical data to account for free surface multiples/ghosts.

Thus, since the provided/obtained multi-component geophysical data may be provided/obtained without having been processed to account for free surface multiples, and since the method may obtain the focussing function(s) and/or Green's function(s) directly from the (optionally separated) provided/obtained multi-component geophysical data, the focussing function(s) and/or Green's function(s) may be obtained without processing the data to account for free surface multiples. The present method can account for the free surface multiples without having to process the geophysical data to account for the surface multiples themselves.

The acquired data may not be processed prior to use in the present method in order to transfer the data to a scenario where there is no free surface. Unlike the known Marchenko methods, this is no longer needed.

The free surface may be the Earth's surface-air boundary (when onshore), but is preferably the sea surface-air boundary (when offshore).

Preferably, the provided multi-component geophysical data is (or at least originates from) raw geophysical data produced by an acquisition set-up where at least one geophysical source is not coincident with at least one geophysical receiver. As is discussed above, the known methods require the raw acquired geophysical data to have been acquired using an acquisition set-up (or being processed to mimic an ideal acquisition set-up) where each source is at the precisely the same location as a respective receiver. However, the present method does not require every source to be at the same location (coincident) with a respective receiver. Indeed, every source may be at a different location to any receiver used. This is of great benefit as it is extremely difficult to accurately locate (or mimic in processing to the ideal scenario) sources and receivers to be coincident with one another. It is therefore much easier to perform the present invention, as it is much easier to produce the necessary geophysical data.

The provided up/down-geophysical data may be produced by an acquisition set-up where a plurality of geophysical sources are not coincident with any geophysical receivers.

Thus, the method may also comprise obtaining the multi-component geophysical data (either directly or indirectly) using an acquisition set-up where at least one geophysical source is not coincident with at least one receiver.

When not coincident, the source(s) may be separated from the receiver(s) by at least 1 m, 5 m, 10 m, or 100 m.

Thus, the source(s) or the receiver(s) may be arbitrarily located. This is in contrast to the existing method where both are required to have fixed given locations.

The acquired data may not be processed prior to use in the present method in order to transfer the data to a scenario where the source location(s) are coincident with the receiver location(s). Unlike the known Marchenko methods, this is no longer needed.

Preferably, the provided up-down geophysical data is (or at least originates from) raw geophysical data produced by an acquisition set-up where at least one geophysical source is at a depth different to at least one geophysical receiver. As is discussed above, the known methods require the raw acquired geophysical data to have been acquired using an acquisition set-up where each source is at the precisely the same depth as each receiver. However, the present method does not require every source to be at the same depth as every receiver. Indeed, every source may be at a different depth compared to any receiver used. This is of great benefit as it is extremely difficult to accurately locate sources and receivers to be at the same depth. For instance, in typical geophysical acquisition (such as PRM), a source(s) is towed proximate the sea surface whilst a receiver(s) is located proximate the sea bed. It is therefore much easier to perform the present invention, as it is much easier to produce the necessary geophysical data.

The provided up/down-geophysical data may be produced by an acquisition set-up where a plurality of geophysical sources are at a different depth to any geophysical receivers used.

Thus, the method may also comprise obtaining the multi-component geophysical data (either directly or indirectly) using an acquisition set-up where at least one geophysical source is not at the same depth as at least one receiver.

When not at the same depth, the source(s) may be separated in depth from the receiver(s) by at least 1 m, 10 m, 100 m, or 1000 m.

The receiver(s) may be at a depth above the source(s), but preferably (each of) the source(s) may be at a depth above (each of) the receiver(s). Preferably, the source(s) is located at a depth proximate the sea surface or below the sea surface and the receiver(s) is located at a depth proximate the sea bed, below the sea bed or above the sea bed. Other locations are also possible. In this case, the source(s) may be multi-component source(s).

Preferably, the provided multi-component geophysical data is produced by an acquisition set-up comprising a plurality of source locations and a plurality of receiver locations, the source locations being irregularly distributed and the receiver locations being regularly distributed. In this case, the sources may be above the receivers.

The acquired data may not be processed prior to use in the present method in order to transfer the data to a scenario where the source locations are regularly distributed. Unlike the known Marchenko methods, this is no longer needed.

As is discussed above, the known methods require the raw acquired geophysical data to have been acquired using an acquisition set-up where both the source locations and the receiver locations are regularly and evenly spaced (or at least require data acquired from irregularly spaced source locations to have been processed so that it is transferred to a regularly-spaced (ideal) scenario). However, the present method does not require every source location to be regularly and evenly spaced (either in the real scenario or in a processed, ideal scenario). It is therefore much easier to perform the present invention, as it is much easier to produce the necessary geophysical data.

This is of great benefit as it is extremely difficult in practice to ensure that source locations are regularly and evenly spaced. For instance, in certain geophysical acquisitions, a source(s) is towed proximate the sea surface whilst receivers are located proximate the sea bed. It is possible to have the receivers fixed in a regular and evenly spaced locations, if they are fixed. However, it is difficult to fire the source(s) in regular and evenly spaced locations. It is therefore much easier to perform the present invention, as it is much easier to produce the necessary geophysical data.

Further, it is of great benefit as it is costly and difficult to process data acquired in a real scenario (e.g. irregularly spaced sources) to an ideal scenario (e.g. regularly spaced sources), which would be required by the previous Marchenko methods.

As part of the irregular distribution of source locations, the sources may vary in longitude, latitude and/or depth locations. As part of the regular distribution of receiver locations, the receivers may be regularly/evenly distributed in longitude, latitude and/or depth locations.

Indeed, when considering 4D geophysical data, it can be very difficult to repeat the exact locations of the sources from one time to another. Since the present method allows for irregular locations of the geophysical sources, this problem is alleviated. The method may therefore be a method performing 4D geophysical data acquisition comprising performing any of the methods herein discussed at one time, and performing any of the methods herein discussed at subsequent time(s).

By regularly spaced it may mean that there is a regular repeating pattern of separations between adjacent receivers, or preferably that there is an equal distance between every adjacent receiver (to within less than ±1 m or ±10 m).

Thus, the method may comprise obtaining the multi-component geophysical data using an acquisition set-up comprising a plurality of source locations and a plurality of receiver locations, the source locations being irregularly distributed and the receiver locations being regularly distributed. This obtained multi-component data may be used in the present method without processing the data to transfer it to a modelled/ideal scenario where the sources are regularly distributed.

Alternatively, the provided multi-component geophysical data may be produced by an acquisition set-up comprising a plurality of source locations and a plurality of receiver locations, the source locations being regularly distributed and the receiver locations being irregularly spaced. In this case, the receivers may be above the sources.

The acquired data may not be processed prior to use in the present method in order to transfer the data to a scenario where the receiver locations are regularly distributed. Unlike the known Marchenko methods, this is no longer needed.

As is discussed above, the known methods require the raw acquired geophysical data to have been acquired using an acquisition set-up where both the source locations and the receiver locations are regularly and evenly spaced (or at least require data acquired from irregularly spaced receiver locations to have been processed so that it is transferred to a regularly-spaced (ideal) scenario). However, the present method does not require every receiver location to be regularly and evenly spaced (either in the real scenario or in a processed, ideal scenario). It is therefore much easier to perform the present invention, as it is much easier to produce the necessary geophysical data.

As part of the irregular distribution of receiver locations, the receivers may vary in longitude, latitude and/or depth locations. As part of the regular distribution of source locations, the sources may be regularly/evenly distributed in longitude, latitude and/or depth locations.

By regularly spaced it may mean that there is a regular repeating pattern of separations between adjacent sources, or preferably that there is an equal distance between every adjacent source (to within less than ±1 m or ±10 m).

Thus, the method may comprise obtaining the multi-component geophysical data using an acquisition set-up comprising a plurality of source locations and a plurality of receiver locations, the receiver locations being irregularly distributed and the source locations being regularly distributed. This obtained multi-component data may be used in the present method without processing the data to transfer it to a modelled/ideal scenario where the receivers are regularly distributed.

Of course, the method will still work if the sources and the receivers are regularly spaced, or the data is processed to the ideal scenario. However, the present method avoids the need for these restrictions.

Preferably, the provided multi-component geophysical data is produced by an acquisition set-up comprising a plurality of sources, wherein the plurality of sources are fired simultaneously.

The acquired data may not be processed prior to use in the present method in order to transfer the data to a scenario where the sources are fired sequentially. Unlike the known Marchenko methods, this is no longer needed.

As is discussed above, the known methods require the raw acquired geophysical data to have been acquired using an acquisition set-up where the sources need to be fired sequentially (or at least require data acquired from simultaneous sources to have been processed so that it is transferred to a sequential source (ideal) scenario). However, the present method does not require the sources to be fired sequentially (either in the real scenario or in a processed, ideal scenario). Firing sources simultaneously is of great benefit as it reduces the acquisition time for the same amount of geophysical data.

Thus, the method may comprise obtaining the multicomponent geophysical data using an acquisition set-up comprising a plurality of sources, wherein the plurality of sources are fired simultaneously. This obtained multi-component data may be used in the present method without processing the data to transfer it to a modelled/ideal scenario where the sources are fired sequentially.

However, the sources may also be fired sequentially. Some of sources may be fired sequentially and some simultaneously.

Preferably, the provided multicomponent geophysical data is produced by an acquisition set-up wherein the number of source(s) (or source location(s)) used is not equal to the number of receiver(s) (or receiver location(s)) used.

This obtained multi-component data may be used in the present method without processing the data to transfer it to a modelled/ideal scenario where the number of source(s) (or source location(s)) used is equal to the number of receiver(s) (or receiver location(s)) used.

As is discussed above, the known methods require the raw acquired geophysical data to have been acquired using an acquisition set-up there are equal numbers of source(s) and receiver(s) (or at least require data acquired from simultaneous sources to have been processed so that it is transferred to a sequential source (ideal) scenario). However, the present method does not require there to be equal number of sources and receivers (either in the real scenario or in a processed, ideal scenario).

This is of great benefit as it allows the acquisition of the data to be much more straightforward—it may be difficult in practice to ensure that there are equal numbers of sources and receivers. It is therefore much easier to perform the present invention, as it is much easier to produce the necessary geophysical data.

There may be fewer receiver(s) (or receiver location(s)) than source(s) (or source location(s)). However, there are preferably fewer source(s) (or source location(s)) than receiver(s) (or receiver locations(s)).

Thus, the method may comprise obtaining the multicomponent geophysical data using an acquisition set-up wherein the number of source(s) (or source location(s)) used is not equal to the number of receiver(s) (or receiver location(s)) used. This obtained multi-component data may be used in the present method without processing the data to transfer it to a modelled/ideal scenario where the number of source(s) (or source location(s)) used is equal to the number of receiver(s) (or receiver location(s)).

Preferably, there is provided (non-separated) multi-component geophysical data, and the method comprises up/down-separating the raw geophysical data to produce up/down-separated geophysical data. This separation may be the only (non trivial) processing step performed to the raw data prior to its use in obtaining the focussing and/or Green's functions. The raw geophysical data may be measured using a dual sensor. It may be dual sensor raw geophysical data. The raw data may be pressure and particle velocity data.

Preferably, the method comprises obtaining raw multi-component geophysical data. The raw geophysical data may be measured using a dual sensor or multicomponent receiver. It may be dual sensor raw geophysical data. The multicomponent data may be pressure and particle velocity data. Geophysical data may be acquired using known acquisition apparatus (e.g. known sources and receivers) and known acquisition methods.

Preferably the geophysical data is (or has been) obtained using a dual sensor, such that it is dual sensor geophysical data. In this case, the data may be pressure and vertical particle velocity. The raw geophysical data may be separated into multi-component geophysical data using the following relationship: $v_z^{\pm} = v_z \mp k_z/(\rho\omega)p$, where $v_z^-$ is the upgoing component, $v_z^+$ is the downgoing components, $v_z$ is the vertical particle velocity, $k_z$ is the vertical wavenumber (Wapenaar, 1998), $\rho$ is the density of the geophysical structure (in the vicinity of the receiver(s)), $\omega$ is the angular frequency of the geophysical energy recorded and p is the pressure of the geophysical energy recorded.

The geophysical data obtained or provided in any of the methods disclosed herein is preferably reflection geophysical data, preferably obtained by having sources and receivers on, above or proximate to the Earth's surface.

The geophysical structure discussed in this invention is preferably the Earth's crust and/or sediment layer.

The method may be for onshore geophysical data, but is preferably for offshore geophysical data.

The method may make use of data obtained from permanent reservoir monitoring (PRM) apparatus. PRM is particularly useful as the receivers are already regularly spaced. This may be of particular use for 4D geophysical monitoring.

In another aspect, the invention provides a method of generating an image of a geophysical structure. This may comprise using the focussing function(s) and/or Green's function(s) obtained by any of the methods disclosed herein to generate the image. It is well known in the art how to convert focussing function(s) and/or Green's function(s) into geophysical images. Preferably, it is the focussing function(s) that is used for imaging as these have fewer events than the Green's function(s), and so are easier to process.

In another aspect, the invention provides a method of geophysical inversion (e.g. seismic inversion). This may comprise using the focussing function(s) and/or Green's function(s) obtained by any of the methods disclosed herein during the inversion. It is known how to use focussing function(s) and/or Green's function(s) in inversion calculations. Preferably, it is the focussing function(s) that is used for inversion as these have less data than the Green's function(s), and so are easier to process. Imaging may be an exemplary inversion calculation.

In another aspect, the invention provides a computer program product comprising computer readable instructions that, when run on a computer, is configured to perform any of the methods discussed herein.

In another aspect, the invention provides a method of performing 4D geophysical data acquisition comprising performing any of the methods herein discussed at one time, and performing any of the methods herein discussed at subsequent time(s). When considering 4D geophysical data, it can be very difficult to repeat the exact locations of the sources from one time to another. Since the present methods allows for irregular locations of the geophysical sources (without the need for processing to an idealised scenario), this problem is alleviated.

In the above-discussed methods, the Green's function(s) and/or the focussing function(s) may be found by solving (or inverting) the following equation (or any non trivial equivalent of this equation):

$$\begin{bmatrix} -\bar{g}^- \\ \bar{g}^{+*} \end{bmatrix} = \begin{bmatrix} v_z^+ & v_z^- \\ v_z^{-*} & v_z^{+*} \end{bmatrix} \begin{bmatrix} f^- \\ f^+ \end{bmatrix}$$

where $\bar{g}^-$ is the upgoing Green's function for a given focussing location (in the real scenario, e.g. including sea surface effects), $\bar{g}^+$ is the downgoing Green's function from the same given focussing location (in the real scenario, e.g. including sea surface effects), $f^-$ is the upgoing focussing function for the same given focussing location, $f^+$ is the downgoing focussing function for the same given focussing location, $v_z^-$ is an operator that can convolve the focussing functions with upgoing vertical velocity measurements over a plurality of measurement locations and $v_z^+$ is an operator that can convolve the focussing functions with downgoing vertical velocity measurements over the same plurality of measurement locations. Finally, * denotes complex conjugation (i.e., time-reversal in the time domain) and is used on the convolutional operators ($v_z^-$ and $v_z^+$) to transform them into correlational operators. A full derivation and explanation of this equation is given below.

This equation may be solved by using a suitable window functions ($\Theta$). A window function $\Theta$ may mute or exclude all energy that arrives after a time $t_d$ and before a time $-t_d$ from when the Green's function is triggered at the focussing location (where $t_d$ is the time it takes for the first arrival of the Green's function to travel from the virtual source/focussing location to the sources). Since no energy from the Green's function will reach the receiver ahead of the first arrival, it follows that:

$\overline{\Theta g^-} = 0$ and $\overline{\Theta g^+} = 0$.

Thus, when the time window is used in the above equation (e.g. multiplied to both sides of the above equation), the equation solved (or inverted) may be (any non trivial equivalent of):

$$\begin{bmatrix} -\overline{\Theta v_z^- f_d^+} \\ -\overline{\Theta v_z^{+*} f_d^+} \end{bmatrix} = \begin{bmatrix} \overline{\Theta v_z^+} & \overline{\Theta v_z^-} \\ \overline{\Theta v_z^{-*}} & \overline{\Theta v_z^{+*}} \end{bmatrix} \begin{bmatrix} f^- \\ f_m^+ \end{bmatrix}.$$

where the downgoing focussing function $f^+ = f_d^+ + f_m^+$. That is, $f^+$ is composed of a direct wave $f_d^+$ followed by a subsequent coda $f_m^+$. A full derivation and explanation of this equation is given below.

The focussing function(s) may be obtained using an optimisation technique such as a gradient-based optimisation procedure. The Green's function(s) may be directly computed from the focussing function(s) as in above equation.

It should be appreciated that in the present specification where mathematical relationships, steps and techniques are set out these should be considered to cover any trivial alteration to the relationships, steps and techniques. The skilled person would be aware that any minor/trivial/formal alteration (i.e. one that does not change the overall mathematical process used in the present invention, such as simply rearranging equations, combining equations or trivially reordering the steps) are using the same relationships, steps and techniques set out in the present specification and hence would fall within the scope of this invention, as defined by the claims. For instance, each $v_z^+$ term in equation 10 could be exchanged with the weighted sum/subtraction of pressure and velocity.

In another aspect the invention provides a method of prospecting for hydrocarbons, comprising: performing any of the methods discussed above; and using the redatumed geophysical data to prospect for hydrocarbons. This latter step may involve using the redatumed geophysical data to decide where to drill.

In another aspect the invention provides a method of producing hydrocarbons, comprising: performing any of the methods discussed above; and producing hydrocarbons. The location or direction or depth of the well through which the hydrocarbons are produced may be chosen using the redatumed geophysical data produced using any of the methods discussed above.

BRIEF DESCRIPTION OF THE DRAWINGS

More details of the theory behind this invention and some worked examples are provided below with reference to following Figures, which are provided by way of example only.

DETAILED DESCRIPTION OF THE INVENTION

1. Introduction to Theory

Figure 1:
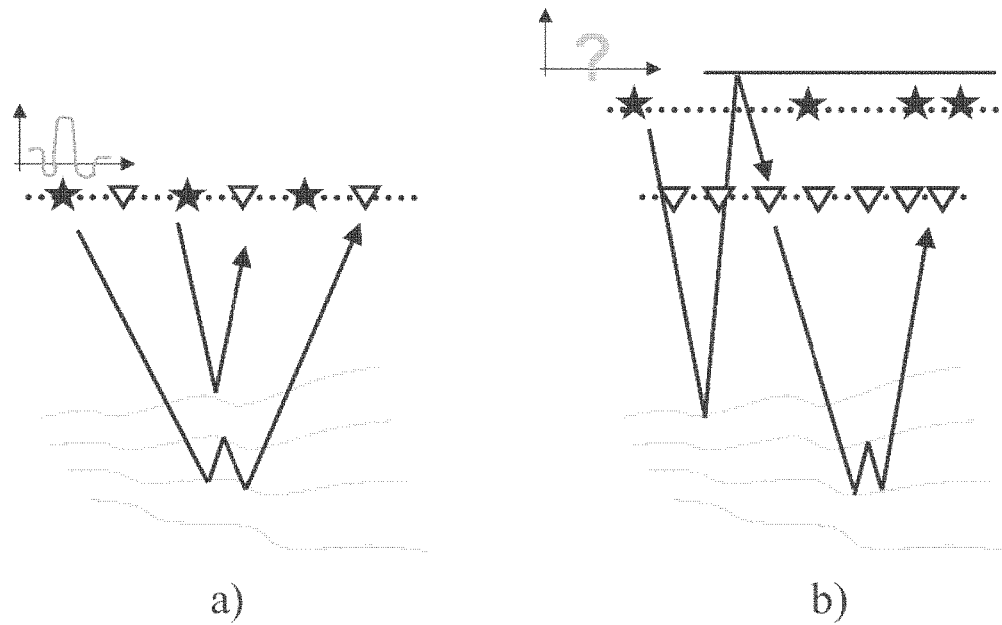
FIG. 1 shows a schematic view of how the present method (FIG. 1(b)) has fewer requirements than the known Marchenko method (FIG. 1(a))

As is mentioned in the introduction of this specification, retrieving the correct focusing and/or Green's function from a virtual source in a subsurface using data measured at the surface is a key component for any imaging and inversion algorithm. Yet, producing full wavefield responses that contain internal multiples with correct amplitudes has long presented a challenge. Recent research on Marchenko-type equations revealed that such virtual responses (the "Green's functions"), as well as special wavefields that focus at any chosen point in the subsurface (the "focussing functions"), can be constructed by iterative substitution (Broggini et al., 2012; Wapenaar et al., 2014a) or direct inversion (van der Neut et al., 2015a) of Marchenko-type equations. Knowledge of these Green's functions and/or the focussing functions enables accurate imaging of deep subsurface targets with no artefacts from overburden-related internal multiples, and opens the way to new techniques for target-oriented imaging (van der Neut et al., 2013) and inversion (Vasconcelos et al, 2014; Broggini and Robertsson, 2014), microseismic source localization (Behura et al., 2013), and primary prediction (Meles et al., 2015).

However, despite first encouraging results reported on field data (Ravasi et al., 2015; van der Neut et al., 2015b), the coupled Marchenko equations require some very strict acquisition requirements, as discussed in the introduction of this specification. For instance, the sources and receivers must be coincident (i.e. at the same depth and location); accurate knowledge/calculation of the source wavelet is required; deconvolution of the source wavelet from the recorded data prior to redatuming is required; and removal of direct wave, source- and receiver-side ghosts and surface related multiples is needed.

While Singh et al. (2015) have shown that free-surface multiples can also be included in the redatuming scheme, yielding an additional integral in the Marchenko equations that requires knowledge of a ghost model, methods to handle the other two strict requirements have not been presented to date.

The present method addresses all three of these strict requirements, and more. As is mentioned above, and as is discuss in more detail later, the inventor has discovered that, provided the availability of seismic data that can multi-component, such as dual-sensor (e.g., pressure and vertical particle velocity) data, these strict requirements can be overcome.

As is discussed in detail below, the inventor's discovery originated from a realisation that the coupled Marchenko equations can be combined with a one-way version of the Rayleigh integral representation to provide a new redatuming scheme that handles band limited seismic data from any acquisition system that presents arbitrarily located sources (preferably above a line of regularly sampled receivers), while also including free-surface effects. Here, the "band limited" data is data that is shaped by a source wavelet. As has been discussed above, using the present method such a wavelet does not need to be removed (and therefore known) prior to redatuming.

The Green's function(s) and the focussing function(s) can then be found by solving this newly-found relationship, for instance by an optimisation procedure such as a gradient-based optimisation procedure, using multi-component recorded seismic data.

As a schematic view of the fewer acquisition requirements needed for the present method, FIG. 1 is provided. In FIG. 1, each star indicates a source and each triangle indicates a receiver. The arrows show exemplary seismic energy paths reflecting off boundaries of a geophysical structure from source to receiver.

FIG. 1(a) shows the ideal scenario for acquisition geometry required by the existing technology. Thus, all sources and receivers are located at the same depth as each other and are regularly and evenly spaced from one another. In reality, this ideal scenario is not physically possible, so data gathered in the real scenario is required to be pre-processed to transfer the real data to the idealised scenario. However, there are inevitable inaccuracies and approximations involved in doing this pre-processing, and the pre-processing is costly. Further, the waveform shown adjacent one of the sources is present in the Figure to emphasise that in the existing technology knowledge about the source wavelet is required for redatuming.

FIG. 1(b) shows a typical acquisition set-up that works for the current method. As can be seen, the requirements have been much relieved in comparison to FIG. 1(a). For instance, the sources no longer need to be regularly spaced or at the same depth as the receiver. Further, the question mark (?) adjacent the source is present in the Figure to emphasise that no knowledge about the source wavelet is required for redatuming. Further still, a free surface (e.g. the sea surface) above the sources is shown to emphasise that the present method can handle free surface multiples and does not require it to be removed prior to redatuming, unlike the existing technology.

2. Background to the Marchenko Equations Theory of the Prior Art

The existing technology (the Marchenko equations) is derived from considering two different states (states A and B), each being idealised/simplified models of a geophysical structure, such as the Earth's crust or sedimentary layer. The model of state A is different to the model of state B, as is described below.

FIG. 2(a) shows state A. State A is the ideal scenario that has been discussed at length above. The model of the geophysical structure here comprises an inhomogeneous lossless medium below a transparent boundary (i.e., the acquisition level $\Lambda_R$) that has substantially identical properties to the geophysical structure below depth $\Lambda_R$. Of course, these substantially identical properties are somewhat simplified in comparison to the real geophysical structure. A second transparent boundary is located at an arbitrary depth level $\Lambda_F$. Below the second transparent boundary, the model of state A is also identical to the physical medium of the geophysical structure below the level $\Lambda_R$. Above the acquisition level $\Lambda_R$ there is no reflection surface or indeed anywhere in the model. By considering a source (the star) at $x_R'$ just above the level $\Lambda_R$, the reflection response R from source $x_R'$ to receiver (the triangle) $x_R$ is shown in FIG. 2(a). The reflection response R is the data that is recorded at receiver $x_R$ when source $x_R$ is fired in the described state.

A virtual source is located in the model of state A at $x_F$ (which is a focussing location, and is located at the arbitrary depth level $\Lambda_F$). The up-radiating and down-radiating Green's functions ($g^-$ and $g^+$) from source $x_F$ to receiver $x_R$ are defined in state A. Since state A is a simplified model of the actual geophysical substructure, the Green's functions and the reflection response R in state A are as they would be in the simplified geophysical substructure. Making such simplified models of geophysical structures is common in the field and need not be explained in detail here.

FIG. 2(b) shows state B. The model of the geophysical structure here is simpler than that of state A. This model shares the same medium properties of the physical medium (and hence state A) only between depths $\Lambda_R$ and $\Lambda_F$, but it is homogeneous above $\Lambda_R$ and below $\Lambda_F$. Also, like state A, there is no reflection surface above $\Lambda_R$, or indeed anywhere in the model. Again, similar to the model of state A, the skilled person is well aware of how to construct such a simplified model of a geophysical structure.

In state B, by considering a source $x_F$ just below the level $\Lambda_F$, upgoing $f^-$ and downgoing $f^+$ focussing functions can be defined. The Green's function representations that undergird the coupled Marchenko equations (Wapenaar et al., 2014a) relate the various quantities in states A and B and can be written in the frequency domain as:

$$g^-(x_R, x_F) = \int_{\Lambda_R} R(x_R, x_R') f^+(x_R', x_F) dx_R' - f^-(x_R, x_F) \qquad (1)$$

-continued $$-g^{+*}(x_R, x_F) = \int_{\Lambda_R} R^*(x_R, x'_R) f^-(x'_R, x_F) dx'_R - f^+(x_R, x_F) \quad (2)$$

Here, * denotes complex conjugation (i.e., time-reversal in the time domain), and the integrals in equations 1 and 2 correspond to multidimensional convolution in time domain. The broadband reflection response of the medium $R(x_R,x_R')$ must be here interpreted as twice the pressure recording at $x_R$ from a vertical dipole source at $x_R'$ (Wapenaar and Berkhout, 1989—Appendix B). This gives an expression for the reflection of response:

$$R(x_R, x'_R) = \frac{2}{j\omega\rho(x'_R)} \partial_{z'} g^-(x_R, x'_R) \quad (3)$$

where $\partial_z$ represents the spatial derivative along the depth axis, $\omega$ is the angular frequency, $\rho$ the density at $x_R'$, and j the imaginary unit.

To solve equations 1 and 2, it is convenient to introduce a discrete framework of matrix-vector multiplications (van der Neut et al., 2015a):

$$\begin{bmatrix} -g^- \\ g^{+*} \end{bmatrix} = \left( I - \begin{bmatrix} 0 & R \\ R^* & 0 \end{bmatrix} \right) \begin{bmatrix} f^- \\ f^+ \end{bmatrix} \quad (4)$$

where $g^{\pm}$ and $f^{\pm}$ are vectors that represent the downgoing and upgoing Green's functions and focussing functions respectively and in which the seismic traces are concatenated in the time-space domain, while R and R* can be seen as operators that apply multidimensional convolution and correlation. Matrices I and 0 are the identity matrix and a matrix filled with zeros.

It is $g^+$, $g^-$, $f^+$ and $f^-$ that are desirable to be known for redatuming, imaging and inversion. However, in equation 4 there are effectively four unknowns ($g^+$, $g^-$, $f^+$ and $f^-$) in two equations, which is obviously not directly solvable.

To avoid having to solve an underdetermined system of two equations and four unknowns ($g^+$, $g^-$, $f^+$ and $f^-$), a causality argument can be invoked: by noting that the Green's function contains a direct arrival followed by a scattering coda, a window $\Theta$ is designed such that all events after $t_d(x_R,x_F)$ (the time take for the Green's function direct wave to arrive at receiver $x_R$ from source $x_F$) and before $-t_d(x_R,x_F)$, including the Green's function direct wave itself, are cancelled (i.e., $\Theta g^+=0$ and $\Theta g^-=0$). Fortunately, focussing functions respond to the action of the window in a completely different manner, i.e., $\Theta f^+=f_d^+$ and $\Theta f^-=f^-$ (Wapenaar et al., 2014a). Here, it is assumed that $f^+=f_d^+ + f_m^+$, that is, $f^+$ is composed of a direct wave $f_d^+$ followed by a subsequent coda $f_m^+$. The application of the window $\Theta$ to equation 4 leaves us with the coupled Marchenko equations:

$$\begin{bmatrix} \Theta R f_d^+ \\ 0 \end{bmatrix} = \left( I - \begin{bmatrix} 0 & \Theta R \\ \Theta R^* & 0 \end{bmatrix} \right) \begin{bmatrix} f^- \\ f_m^+ \end{bmatrix} \quad (5)$$

which can be solved by direct inversion (van der Neut et al., 2015a) or expanded as a Neumann series by noting that equation 5 is a discretized Fredholm integral equation of the second kind (Slob et al., 2014).

3. Theory Behind the Present Method

Figure 2:
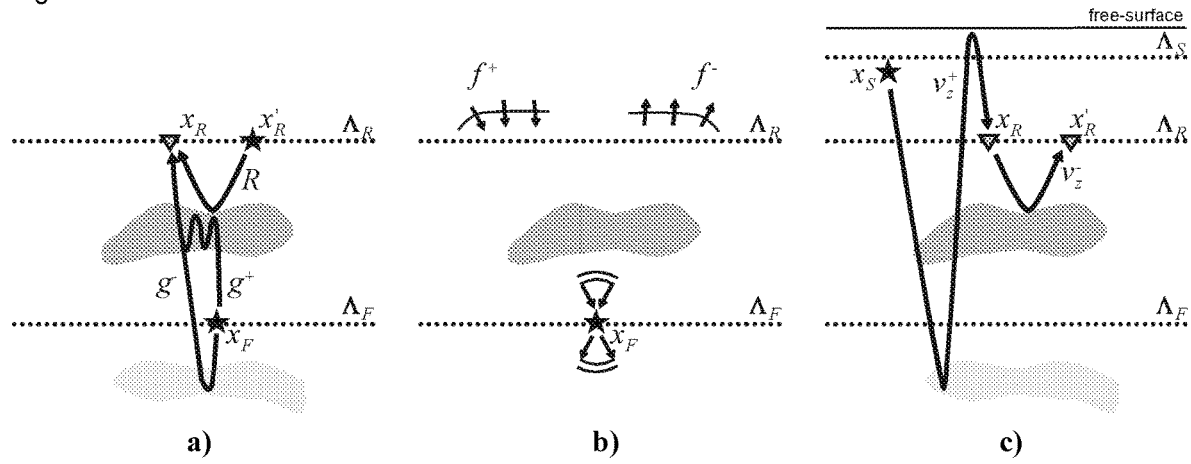
FIG. 2 shows a schematic view of seismic acquisition explaining the theory behind the present method.

With regard to FIG. 2, the inventor constructed a new state, state C shown in FIG. 2(c). State C represents the real, physical acquisition scenario, and (unlike state A) has not been idealised. This state is the same as state A as far as it is a model whose properties are substantially identical (though preferably simplified in comparison to the real geophysical structure) to the actual properties of the geophysical structure, and it has the same two transparent depth levels $\Lambda_R$ and $\Lambda_F$. However, unlike state A, there is also a free surface above the above the depth level $\Lambda_R$ at depth $\Lambda_S$; and the source $x_S$ is located at a depth above the depth level $\Lambda_R$ (but below depth level $\Lambda_S$). Receivers $x_R$ and $x_R'$ are located at the same depth $\Lambda_R$.

With the aim of including the effect of having the source at different depth to the receivers and including the free surface heterogeneity in equations 1 and 2, the inventor used the one-way version of Rayleigh integral representation (Wapenaar and Berkout, 1989) to link the reflection response R in state A to a pair of upgoing and downgoing Green's functions in state C:

$$G^-(x'_R, x_S) = -\int_{\Lambda_R} \frac{2}{j\omega\rho(x_R)} \partial_z G^+(x_R, x_S) G^-(x_R, x'_R) dx_R \quad (6)$$

Here, $G^-(x'_R,x_S)$ is the Green's function response measured by receiver $x_R'$ originating from source $x_S$ in state C; $G^+(x_R,x_S)$ is the Green's function response measured by receiver $x_R$ originating from source $x_S$ in state C; and $G^-(x_R,x'_R)$ is the Green's function response measured at receiver $x_R$ originating from a source at receiver $x_R'$ in state A. Similarly to equation 3 above, here $\partial_z$ represents the spatial derivative along the depth axis, $\omega$ is the angular frequency, $\rho$ the density at $x_R$, and j the imaginary unit.

Multiplying each side of equation 6 by $s(\omega)(j\omega\rho(x'_R))^{-1}\partial_{z'}$ where $s(\omega)$ is the source wavelet spectrum, the inventor obtained:

$$\underbrace{\frac{s(\omega)}{j\omega\rho(x'_R)} \partial_{z'} G^-(x'_R, x_S)}_{-v_z^-(x'_R, x_S)} = \int_{\Lambda_R} \underbrace{-\frac{s(\omega)}{j\omega\rho(x_R)} \partial_z G^+(x_R, x_S)}_{v_z^+(x_R, x_S)} \left( \underbrace{\frac{2}{j\omega\rho(x'_R)} \partial_{z'} G^-(x_R, x'_R)}_{R(x_R, x'_R)} \right) dx_R \quad (7)$$

As can be seen from the annotations below equation 7, by starting with equation 6 and manipulating it using the factor $s(\omega)(j\omega\rho(x'_R))^{-1}\theta_{z'}$, the inventor has found a relationship between upgoing particle velocity, downgoing particle velocity and the response function R of the Marchenko equations. This is because the expression on the left hand side of equation 7 is equal to the negative of the upgoing particle velocity at receiver $x_R'$ from a wavefield originating from source $x_S$ $(-v_z^-(x'_R,x_S))$; the first expression on the right hand side of equation 7 is equal to the downgoing particle velocity at receiver $x_R$ from a wavefield originating from source $x_S(v_z^+(x_R,x_S))$; and the second expression on the right hand side of equation 7 is equal to the reflection response R of the measured reflected seismic wavefield measured at receiver $x_R$ from a source $x_R'$ in state A (this expression is equivalent to equation 3).

Thus, equation 7 relates the reflection response R to the vertical particle velocity measurements from a source at $x_S$, decomposed into their up- and downgoing constituents at the receiver level $\Lambda_R$, for the actual physical scenario (state C).

If each side of equation 1 is multiplied by $v_z^+(x_R,x_S)$ and $v_z^{+*}(x_R,x_S)$ is multiplied to equation 2, after performing integration over receivers and using equation 7, a new set of Green's function representations can be derived such that the focussing functions in state B and the Green's functions in state A are now linked via the upgoing and downgoing vertical particle velocity measurements $v_z^-$ and $v_z^+$ measurements in state C. These equations are given below.

$$\int_{\Lambda_R} v_z^+(x_R, x_S) G^-(x_R, x_F) dx_R = \quad (8)$$
$$-\int_{\Lambda_R} v_z^-(x'_R, x_S) f^+(x'_R, x_F) dx'_R - \int_{\Lambda_R} v_z^+(x_R, x_S) f^-(x_R, x_F) dx_R$$

$$-\int_{\Lambda_R} v_z^+(x_R, x_S) G^{+*}(x_R, x_F) dx_R = \quad (9)$$
$$-\int_{\Lambda_R} v_z^{-*}(x'_R, x_S) f^-(x'_R, x_F) dx'_R - \int_{\Lambda_R} v_z^{+*}(x_R, x_S) f^+(x_R, x_F) dx_R$$

In summary, by linking the response function R to vertical upgoing and downgoing particle velocities (i.e. up/down-separated multi-component seismic data) using the Rayleigh relationship of equation (6), the inventor has been able to eliminate the response function R from equations 1 and 2, which means that there is no longer any need to account for the source wavelet. Instead, in equations 8 and 9, the Green's functions and the focussing functions are related only via actual measured multi-component seismic data.

Further, in contrast to equations 1 and 2, equations 8 and 9 no longer require the source(s) and the receivers to be at the same depth, since the integrations are not performed over the source location $x_S$. This is unlike equations 1 and 2 where the integration is performed over the source location $x_R'$. Similarly, the sources no longer need to be regularly spaced.

In the existing Marchenko method, the focussing functions are described sometimes as a functions of $x_R$ (the focussing functions outside the integrals of equations 1 and 2) and sometimes as functions of $x_R'$ (the focussing functions inside the integrals of equations 1 and 2). However, in equations 1 and 2, $x_R$ refers to a receiver and $x_R'$ refers to a source. Because of this, in order to transition from equations 1 and 2 to equations 4 and 5 (the latter being the equation to be solved when performing the existing Marchenko method) it is required to have sources ($x_R'$) and receivers ($x_R$) at the same locations as each other. In contrast, the present method does not require sources and receivers to be at the same location. The focussing functions in equations 8 and 9 are only functions of receiver locations ($x_R'$ and $x_R$). There is therefore no constraint on the source sampling or source location.

Equations 8 and 9 can be written as:

$$\begin{bmatrix} -\overline{g}^- \\ \overline{g}^{+*} \end{bmatrix} = \begin{bmatrix} v_z^+ & v_z^- \\ v_z^{-*} & v_z^{+*} \end{bmatrix} \begin{bmatrix} f^- \\ f^+ \end{bmatrix} \quad (10)$$

Here, $v_z^-$ and $v_z^+$ ($v_z^{-*}$ and $v_z^{+*}$) are operators that apply multidimensional convolution (correlation) with the upgoing and downgoing vertical velocity measurements. Moreover, by noting that the terms on the left hand side of equations 8 and 9 can be interpreted as the upgoing and downgoing Green's functions with free-surface effects included from the focal point $x_F$, to sources $x_S$, the inventor has written these terms as $\overline{g}^+ = v_z^+ g^+$ and $\overline{g}^- = v_z^+ g^-$.

To solve equation 10, a causality argument is invoked, in a similar way as for equation 5. However, the specific causality argument in this case is different.

Since a step of multidimensional convolution (or correlation) with upgoing and downgoing vertical velocity measurements is applied to Green's and focussing functions, the causality argument holds only for the Green's functions, i.e. and not for the focussing functions.

In particular, if a window $\overline{\Theta}$ that mutes energy before $-t_d(x_S,x_F)$ and after $t_d(x_S,x_F)$ (where $t_d(x_S,x_F)$ is the time taken for the Green's function direct wave to arrive at source location $x_S$ from virtual source $x_F$) is applied to equation 10, focussing functions can be obtained by solving the following system of equations $$\begin{bmatrix} -\overline{\Theta} v_z^- f_d^+ \\ -\overline{\Theta} v_z^{+*} f_d^+ \end{bmatrix} = \begin{bmatrix} \overline{\Theta} v_z^+ & \overline{\Theta} v_z^- \\ \overline{\Theta} v_z^{-*} & \overline{\Theta} v_z^{+*} \end{bmatrix} \begin{bmatrix} f^- \\ f_m^+ \end{bmatrix} \quad (11)$$

where the upgoing focussing function $f^+ = f_d^+ + f_m^+$. That is, r is composed of a direct wave $f_d^+$ followed by a subsequent coda $f_m^+$.

Note that equation 11 is a Fredholm integral of the first kind which cannot be expanded into a Neumann series. In other words, this equation can be solved by direct inversion. It may not be possible to solve equation 11 for the focussing functions using iterative substitution, unlike equation 5.

Thus, as should be appreciated from the above, while equation 5 is only valid when sources and receivers are co-located, equation 11 holds for any (or even a single) source located above $\Lambda_R$: when multiple sources are available, solving the ensemble of equations becomes a better posed problem. Of course, state C and equations 6-11 could be reformulated so that the location of the receiver is arbitrary, or so that the location of the source is at the same depth or a lower depth than the receiver.

4. Numerical Example of Current Method, and Comparison with Existing Marchenko Method In order to demonstrate that the present method of using multi-component seismic data works for a more relaxed acquisition set-up, the following comparison experiment was conducted.

Figure 3:
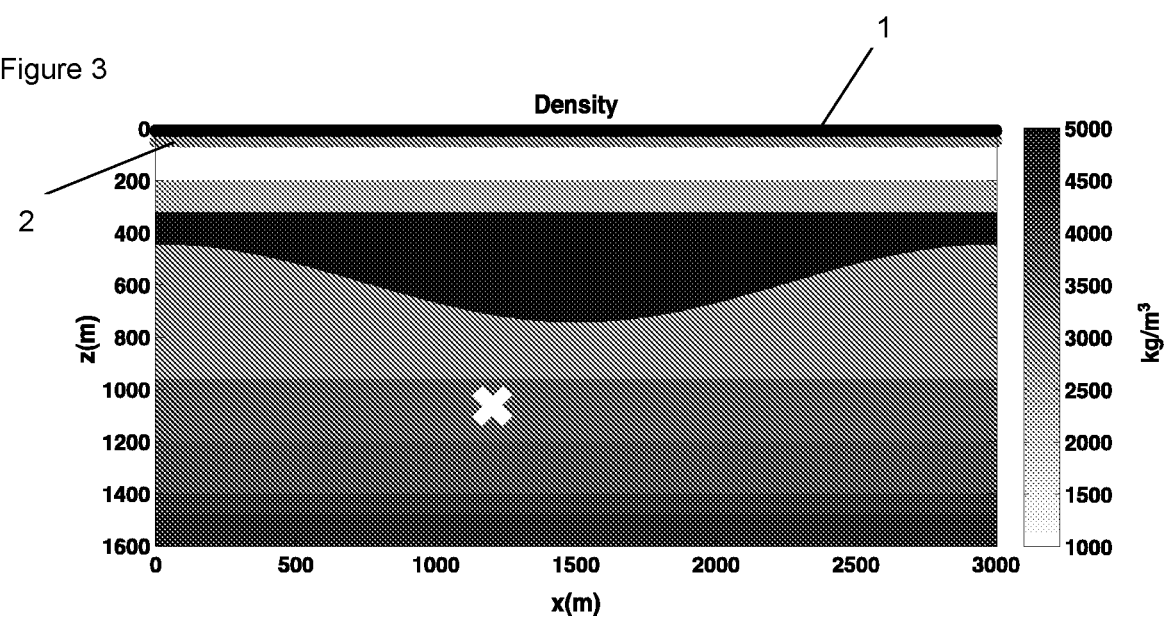
FIG. 3 shows an example of a test model used to test the present method.

In order to perform this comparison, a model was used as shown in FIG. 3. FIG. 3 shows a constant velocity, variable density subsurface model. A solid black line 1 indicates the source array, and a solid grey line 2 refers to the receiver array. A cross is used to indicate the subsurface focal point.

The model is 2D representation of a simplified geophysical structure comprising different layers of different densities. It includes an Earth's surface-sea boundary at a depth of 200 m. The density of the different layers in the substructure can be seen as different shades, as can be seen from the density key in FIG. 3. Thus, as can be seen several layers are present with differing shapes, thicknesses and densities. The model is constructed so that velocity is constant throughout (v=2400 m/s). A free surface (i.e. a sea-air boundary) is included in the model at 0 m depth.

Dual-sensor (i.e., pressure and vertical particle velocity) data are modelled in the model. The seismic energy is input into the model using a line 1 of 201 (two hundred and one) sources located at 10 m depth. The seismic energy is recorded in the model using a line 2 of 201 (two hundred and one) receivers at $\Lambda_R$=50 m depth. A focal point (focussing location) is selected at $x_F$=1200 m, 1040 m (at the cross on FIG. 3). The modelling was done using a finite-difference vector-acoustic scheme (e.g., Vasconcelos et al., 2014), with a 20 Hz Ricker wavelet.

The dual-sensor data is recorded, and is then processed so that it is decomposed into up/down-separated multi-component data (i.e. the upgoing particle velocity and downgoing particle velocity components).

The upgoing $v_z^-$ and downgoing $v_z^+$ constituents are found using $v_z^\pm = v_z \mp k_z/(\rho\omega)p$, where $k_z$ is the vertical wavenumber (Wapenaar, 1998), $\rho$ is the density of the geophysical structure, $\omega$ is the frequency of the seismic energy recorded and $p$ is the pressure of the seismic energy recorded.

The direct part of the focussing function ($f_d^+$) is constructed by reversing in time the first arriving wave from the focussing location $x_F$ to the receiver depth level $\Lambda_R$, computed via finite-difference in a constant velocity ($v_0$=2400 m/s), constant density ($\rho_0$=2400 kg/m$^3$) subsurface model. Note this is the only information that needs to be known with respect to the model.

To construct upgoing and downgoing focussing functions and subsequently the scattering coda of the Green's function from the measured data, the measured multi-component seismic data recorded by the receivers at $\Lambda_R$ is used in equation 11. Equation 11 is inverted using a gradient-based optimization scheme, such as LSQR (Pauge and Saunders, 1982). The outputs of this inversion are the focussing functions and Green's functions calculated by the present method.

Using the model of FIG. 3, focussing functions for the existing Marchenko redatuming method can also be calculated. This is done by inverting the original Marchenko equation 5 using the same number of iterations as for the present method's inversion of equation 11. In both cases a preconditioning operator has been added as suggested by van der Neut et al. (2015), ensuring that the retrieved focussing functions contain events only inside the window $\Theta$.

It should be noted that, in order to meet the strict acquisition requirements necessary to perform the existing Marchenko method, in order to calculate the focussing functions for the existing Marchenko method, a new seismic dataset had to be produced using the model of FIG. 3. In this new model, the geophysical structure is the same as for when the data for the present method was produced. However, the sources were placed at the same location as the receivers; the free-surface was replaced by an absorbing boundary; the source wavelet was known and deconvolved from the recorded data; and the direct wave has been removed.

Since it is known that the existing Marchenko outputs correct focussing functions as long as the strict acquisition requirements are met, if the focussing functions output from the present method match the focussing functions of the existing Marchenko method then it is evidence that the present method can successfully construct focussing functions without the need for the strict acquisition requirements. [As has been mentioned above, the focussing functions output from the present method should be, from the theory at least, the very same focussing functions output from the existing Marchenko method for the same focussing location in the same geophysical structure.]

Figure 4:
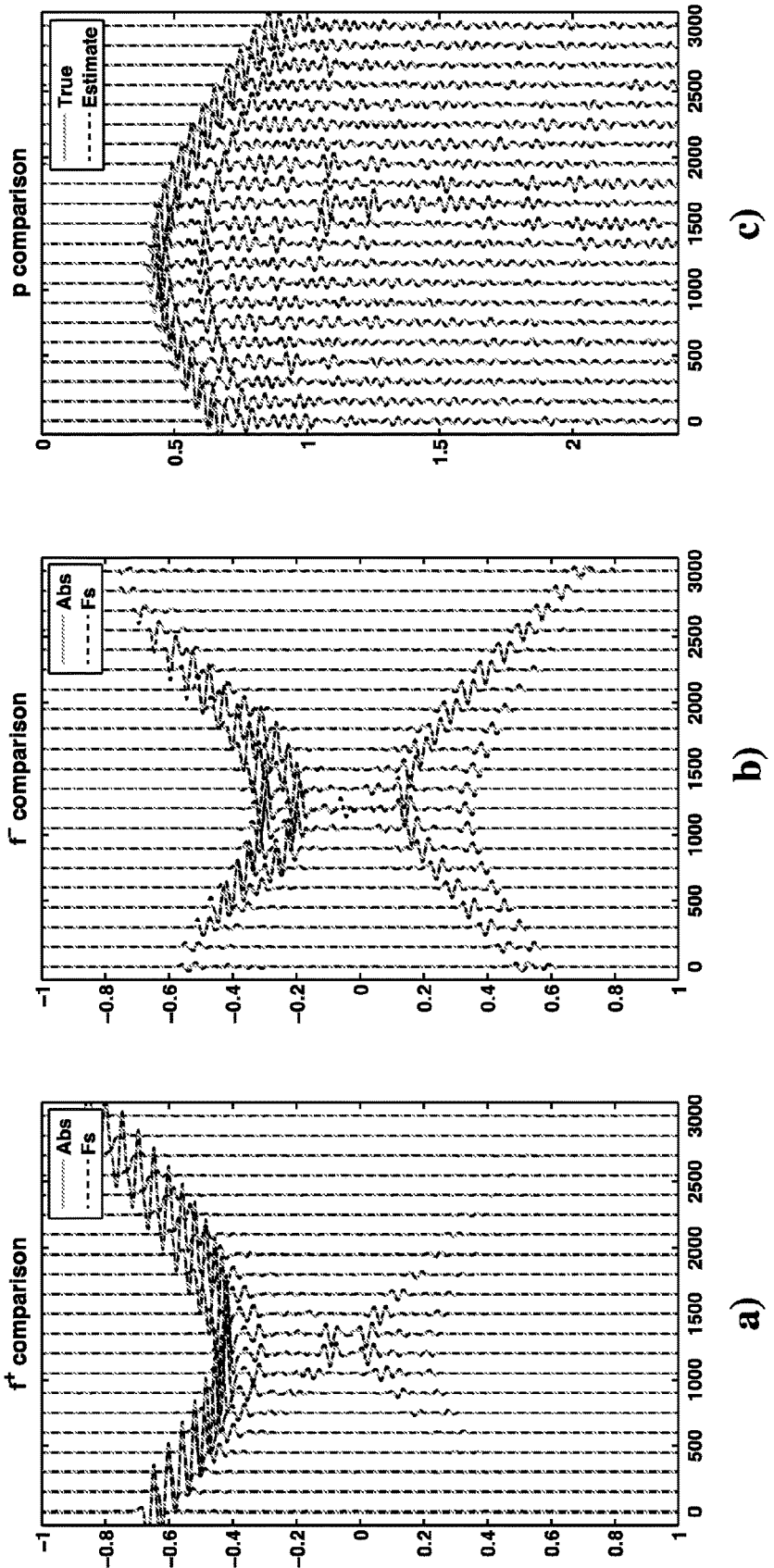
FIG. 4 shows comparative results of the test run on the model of FIG. 3 showing the effectiveness of the present method.

With regard to FIG. 4(*a*) this shows a comparison of the downgoing focussing functions calculated after 30 iterations using the existing Marchenko method (solid grey lines, marked "Abs") and the new method (dotted lines, marked "Fs"). The plot shows receiver position along the horizontal axis against time along the vertical axis. For clarity, only a certain number of traces are shown (e.g. only every 10$^{th}$ receiver trace is shown); this is only done for the sake of clarity—if all receivers were shown the diagram would be very unclear.

As can be seen from the close correlation between the solid and dotted lines, the downgoing focussing function calculated using the present method (using a less-strict acquisition set-up) is very similar—almost identical—to the downgoing focussing function calculated using the existing Marchenko method (using a very-strict acquisition set-up). This is evidence that the present method can be used to obtain focussing functions with fewer acquisition requirements or without the need for pre-processing acquired data into the idealised scenario.

With regard to FIG. 4(*b*) this shows a comparison of the upgoing focussing functions calculated after 30 iterations using the existing Marchenko method (solid grey lines, marked "Abs") and the new method (dotted lines, marked "Fs"). The plot shows receiver position along the horizontal axis against time along the vertical axis. For clarity, only a certain number of traces are shown (e.g. only every 10$^{th}$ receiver trace is shown); this is only done for the sake of clarity—if all receivers were shown the diagram would be very unclear.

As can be seen from the close correlation between the solid and dotted lines, the upgoing focussing function calculated using the present method (using a less-strict acquisition set-up) is very similar—indeed almost identical—to the upgoing focussing function calculated using the existing Marchenko method (using a very-strict acquisition set-up). This is evidence that the present method can be used to obtain focussing functions with fewer acquisition requirements or without the need for pre-processing acquired data into the idealised scenario.

The Green's function itself for the focussing location $x_F$ was also calculated using the present method and the model of FIG. 3. This was done similarly to how the focussing functions were found: by using the recorded multi-component seismic data in equation 11.

In order to show that the Green's function calculated by the present method are accurate, despite the flexible acquisition geometry used to gather the seismic data as well as minimal processing, a Green's function for the source $x_F$ was also created in a separate data run in the model. If the Green's functions output from the present method match the actual Green's functions of the geophysical structure when a source is located at the focussing location then it is evidence that the present method can successfully construct Green's functions without the need for accurate velocity models and strict acquisition/processing requirements prior to redatuming. [As has been mentioned above, the Green's functions output from the present method should be, from the theory at least, the very same Green's functions as would be expected to be measured if a source were actually located at the focussing location (i.e. the "actual" Green's function). This cannot be said for the existing Marchenko method where the Green's functions calculated are not the same as the "actual" Green's functions; instead they are the Green's functions in the ideal scenario of state A.]

With regard to FIG. 4(c) this shows a comparison of the Green's functions using the source at $x_F$ (solid grey lines, marked "True") and the present method (dotted lines, marked "Estimate"). The plot shows receiver position along the horizontal axis against time along the vertical axis. For clarity, only a certain number of traces are shown (e.g. only every $10^{th}$ receiver trace is shown); this is only done for the sake of clarity—if all receivers were shown the diagram would be very unclear.

As can be seen from the close correlation between the solid and dotted lines, the Green's functions calculated using the present method (using a less-strict acquisition set-up) are very similar—indeed almost identical—to the "actual" Green's functions. This is evidence that the present method can be used to obtain Green's functions with fewer acquisition requirements than for the Marchenko method or without the need for pre-processing acquired data into the idealised scenario.

As an aside about this numerical test, it should be noted that because both the data and the initial focussing functions are band-limited by a 20 Hz Ricker wavelet, the retrieved Green's function (and thus also the "actual" modelled Green's function) is shaped by the autocorrelation of a 20 Hz Ricker wavelet. While the wavelet that acts on the data has been considered unknown, any other wavelet could be chosen for the initial focussing function. It could be then deconvolved deterministically from the retrieved Green's function to broaden its bandwidth. Lastly, given the high computational cost in the application of the multidimensional convolution (correlation) operators, it is important that the gradient-based inversion converges quickly to the correct solution. It has been found that the results of the iteration converge quickly to the correct values when finding the focussing and/or Green's functions.

As a further extension of the present method, to show that focussing functions and Green's functions can be found using data gathered from an even more flexible acquisition set-up and without requiring pre-processing to an ideal scenario, two further comparison were carried out.

Figure 5:
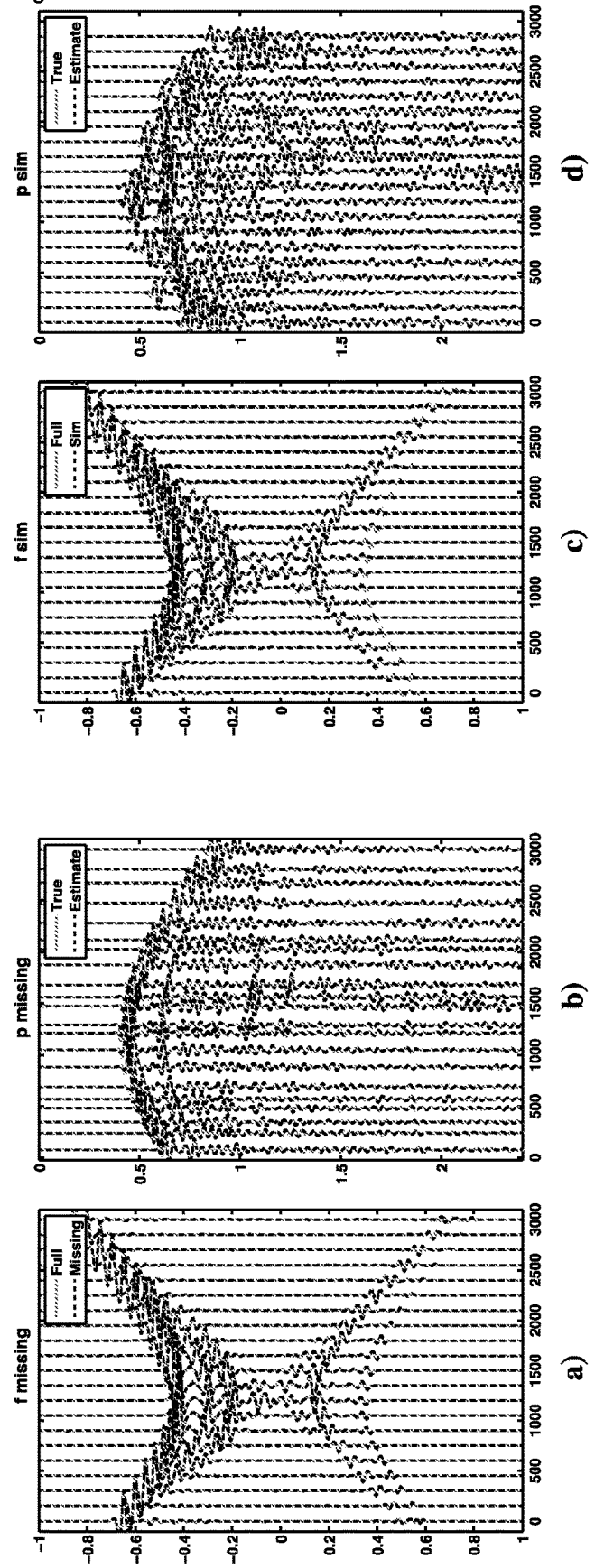
FIG. 5 shows more comparative results of the test run on the model of FIG. 3 showing the effectiveness of the present method for irregular and simultaneous sources.

Firstly, with regard to FIGS. 5(a) and (b), the new method was performed using data gather from the model of FIG. 3, except where the previously evenly-distributed source array was randomly decimated, in this case by a factor of two. This means that there are fewer (half of the previously available) equations available to solve for the focussing functions. Further, this means that the sources are not regularly distributed (as well as not being coincident with, and at the same depth as, the receivers).

With regard to FIG. 5(a) this shows a comparison of the focussing functions calculated after 30 iterations using the new method with no sources removed (solid grey lines, marked "full") and the new method with half the sources randomly decimated (dotted lines, marked "Missing"). The plot shows receiver position along the horizontal axis against time along the vertical axis. For clarity, only a certain number of traces are shown (e.g. only every $10^{th}$ receiver trace is shown); this is only done for the sake of clarity—if all receivers were shown the diagram would be very unclear.

As can be seen from the close correlation between the solid and dotted lines, the focussing functions calculated using the present method having half the sources randomly decimated is very similar—almost identical—to the focussing functions calculated using the present method but using all of the sources. This is evidence that the present method can be used to obtain accurate focussing functions with having fewer sources and by having non-regularly spaced sources and without the need for pre-processing acquired data into the idealised scenario.

With regard to FIG. 5(b) this shows a comparison of the Green's functions calculated from the focusing functions using the source at $x_F$ (solid grey lines, marked "True") and the present method but with half the sources randomly decimated (dotted lines, marked "Estimate"). The plot shows receiver position along the horizontal axis against time along the vertical axis. For clarity, only a certain number of traces are shown (e.g. only every $10^{th}$ receiver trace is shown); this is only done for the sake of clarity—if all receivers were shown the diagram would be very unclear.

As can be seen from the close correlation between the solid and dotted lines, the Green's functions calculated using the present method having half the sources randomly decimated is very similar—almost identical—to the Green's function calculated using the present method but using all of the sources. This is evidence that the present method can be used to obtain accurate Green's functions with having fewer sources and by having non-regularly spaced sources and without the need for pre-processing acquired data into the idealised scenario.

Secondly, with regard to FIGS. 5(c) and (d), the new method was performed using data gather from the model of FIG. 3, except where the previously sequentially-fired sources were fired such that two adjacent sources are shot simultaneously (with a random ignition time of $t_i \sim U(0,0.25)$ s.

With regard to FIG. 5(c) this shows a comparison of the focussing functions calculated after 30 iterations using the new method with purely sequential sources (solid grey lines, marked "full") and the new method with simultaneous sources (dotted lines, marked "Sim"). The plot shows receiver position along the horizontal axis against time along the vertical axis. For clarity, only a certain number of traces are shown (e.g. only every $10^{th}$ receiver trace is shown); this is only done for the sake of clarity—if all receivers were shown the diagram would be very unclear.

As can be seen from the close correlation between the solid and dotted lines, the focussing functions calculated using the present method using simultaneous sources is very similar—almost identical—to the focussing functions calculated using the present method but using purely sequential sources. This is evidence that the present method can be used to obtain accurate focussing functions whilst using simultaneous sources, which can cut down on acquisition time.

In this case, solving for the focusing functions is effectively equivalent to solving a linear combination equation 11 that has been solved for sequential sources. In other words, direct inversion of the modified Marchenko equations is also responsible for source deblending.

With regard to FIG. 5(d) this shows a comparison of the Green's functions using the source at $x_F$ (solid grey lines, marked "True") and the present method but with simultaneous sources (dotted lines, marked "Estimate"). The plot shows receiver position along the horizontal axis against time along the vertical axis. For clarity, only a certain number of traces are shown (e.g. only every $10^{th}$ receiver trace is shown); this is only done for the sake of clarity—if all receivers were shown the diagram would be very unclear.

As can be seen from the close correlation between the solid and dotted lines, the Green's function calculated using the present method with simultaneous sources is very similar—almost identical—to the Green's function calculated using a source at $x_F$. This is evidence that the present method can be used to obtain accurate Green's functions whilst using simultaneous sources and without the need for pre-processing acquired data into the idealised scenario.

As a further extension of the present method, to show that focussing functions (and hence Green's functions) can be found using data gathered from an even more flexible acquisition set-up and without requiring pre-processing to an ideal scenario, a further comparison was carried out.

Figure 6:
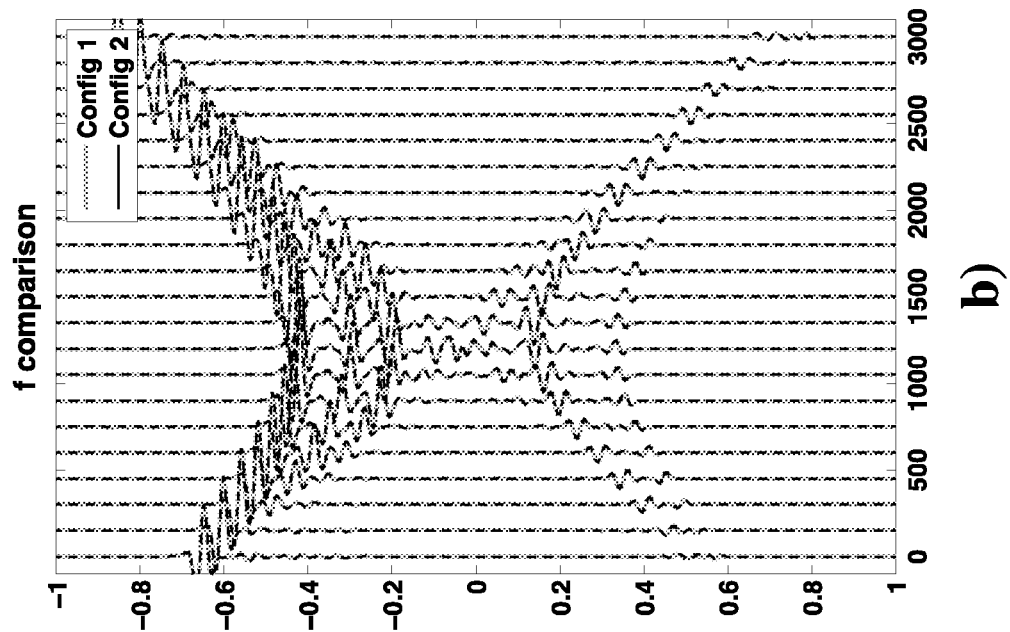
FIG. 6 shows more comparative results of the test run on the model of FIG. 3 showing the effectiveness of the present method with respect to source location repeatability.
Figure 6:
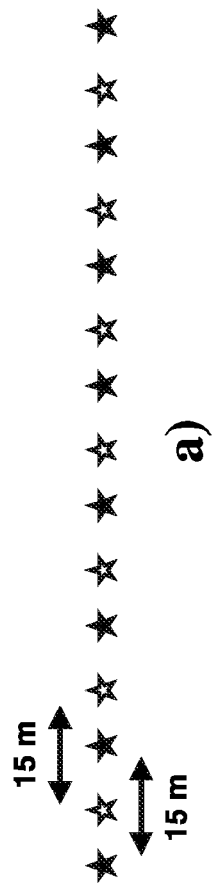

FIG. 6 demonstrates the repeatability of the present method from one survey to another subsequent survey, even if the two surveys do not have the same source locations (as is typically the case when taking subsequent seismic surveys, such as in 4D seismic monitoring).

With regard to FIG. 6(a), this shows a schematic illustration of how sources of a first survey (the black stars) are in different locations to the sources of a second survey (the white stars).

In the modelling, firstly the sources at the first locations (black stars) were fired, the data was acquired and the focussing functions were calculated. The calculated focussing functions are shown in the solid grey lines of FIG. 6(b).

Secondly, the sources were moved to the second locations (white stars), which are offset by 15 m from the first locations (black stars) and hence are not at the same location as the first locations. The sources were then fired, the data was acquired and the focussing functions were calculated. The calculated focussing functions are shown in the dotted lines of FIG. 6(b).

As can be seen from FIG. 6(b), the focussing functions from the first acquisition are largely identical to the focussing functions from the second acquisition, despite the sources being in fired in different locations. This is evidence that the present method can be used to obtain accurate focussing functions and Green's functions from one survey to the next, whilst having the sources at different locations from one survey to the next, and without the need for pre-processing acquired data into the idealised scenario.

5. Summary

The inventor has found a very flexible redatuming scheme, based on the coupled Marchenko equations, that uses multi-component seismic data (e.g. from dual-sensor data) without the need for pre-processing to an idealised scenario prior to redatuming. The redatuming is robust and can handle any acquisition scenario with sources located at a different depth to the receiver (or indeed the same depth, depth is no longer an issue). Further, the sources or the receivers are no longer required to be located at the same horizontal position, and sources do not need to be regularly spaced. Further, the source wavelet need not be known nor accounted for, and free-surface effects need not be separately accounted for. The application of the present method may have benefits in redatuming and imaging of ocean-bottom and borehole seismic data from sequential, or even simultaneous, sources.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

6. REFERENCES

1. Behura J., and Snieder, R., 2013. Imaging direct as well as scattered events in microseismic data using inverse scattering theory. SEG Technical Program, Expanded Abstracts.
2. Berryhill, J. R., 1984. Wave-equation datuming before stack. Geophysics, 49(11), 2064-2066.
3. Broggini, F., Snieder, R., and Wapenaar, K., 2012. Focusing the wavefield inside an unknown 1D medium: Beyond seismic interferometry. Geophysics, 77, A25-A28.
4. Broggini, F., and Robertsson, J. O. A., 2014. FD injection utilizing the wavefields generated by Marchenko redatuming: A target-oriented approach. SEG Technical Program Expanded Abstracts.
5. Meles, G. A., Wapenaar, K., Curtis A., 2015, Synthesising Primary reflections by Marchenko Redatuming and convolutional interferometry, EIP Report, 21.
6. van der Neut, J., C. A. Vidal, N. Grobbe, and K. Wapenaar, 2013, Turning onesided illumination into two-sided illumination by target-enclosing interferometric redatuming. 75th EAGE Conference & Exhibition, Extended Abstracts.
7. van der Neut, J., Thorbecke, J., Wapenaar, K., and Slob, E., 2015a. Inversion of the multidimensional Marchenko equation. 77th annual EAGE meeting.
8. van der Neut, J., Wapenaar, K., Thorbecke, J., and Slob, E., 2015b. Practical challenges in adaptive Marchenko imaging, 85th annual SEG meeting.
9. Pauge, C. C. and Saunders, M. A., 1982. LSQR: An algorithm for sparse linear equations and sparse least squares. Transactions on Mathematical Software, 8(1), 43-71.
10. Ravasi, M., Vasconcelos, I., Kritski, A., Curtis, A., da Costa Filho, C. & Meles, G. A., 2015. Marchenko imaging of Volve Field, North Sea. 77th EAGE Conference and Exhibition, Extended Abstracts.
11. Singh, S., Snieder, R., Behura, J., van der Neut, J., Wapenaar, K., and Slob, E., 2015. Marchenko imaging: Imaging with primaries, internal multiples, and free-surface multiples. Geophysics, 80 (5), S165-S174.
12. Vasconcelos, I., M. Ravasi, and J. van der Neut, 2014, An interferometry-based, subsurface-domain objective function for waveform inversion: 76th EAGE Conference & Exhibition, Extended Abstracts.
13. Wapenaar, C. P. A., and Berkhout, A. J., 1989, Elastic wave field extrapolation: Redatuming of single- and multi-component seismic data: Elsevier Science Publ. Co., Inc.
14. Wapenaar, K., 1998, Reciprocity properties of one-way propagators: Geophysics, 63, 1795-1798
15. Wapenaar, K., Thorbecke, J., van der Neut, J., Broggini, F., Slob, E., and Snieder, R., 2014a, Marchenko imaging: Geophysics, Vol. 79 (3), WA39-WA57.
16. Wapenaar, K., Slob, E, 2014b, On the Marchenko equation for multicomponent single-sided reflection data, Geophysics Journal International, 199 pp. 1367-1371.
17. Van der Neut, J., Wapenaar, K., Thorbecke, J., Vasconcelos, I., 2014, Internal multiple suppression by adaptive Marchenko redatuming, SEG Denver 2014 Annual Meeting, pp. 4055-4059.
18. Liu, Y., Van der Neut, J., Arnsten, B., Wapenaar, K., 2015, Data-driven deep local imaging using both surface and borehole seismic data, SEG New Orleans Annual Meeting 2015, pp 5554-5559.

I claim:

1. A method of prospecting for and producing hydrocarbons, the method comprising: obtaining geophysical data collected using an acquisition setup comprising a plurality of geophysical receivers and a plurality of geophysical sources, wherein at least one geophysical source is not at the same location as at least one geophysical receiver; redatuming the geophysical data, wherein there is provided multi-component geophysical data, and redatuming geophysical data comprises obtaining at least one focussing function and/or at least one Green's function from the multi-component geophysical data, wherein the provided multicomponent geophysical data has not been and is not processed to account for free surface multiples; and using the redatumed geophysical data to determine a location, a direction, or a depth of a well; and producing hydrocarbons from the well based on the determined location, direction, or depth.

2. A method as claimed in claim 1, wherein the provided multi-component geophysical data has not been and is not processed to account for a source wavelet.

3. A method as claimed in claim 1, wherein using the redatumed geophysical data to prospect for hydrocarbons by selecting a location, a direction, or a depth of a well comprises using the obtained at least one focussing function and/or at least one Green's function to generate an image of a geophysical structure and using the image of the geophysical structure to select the location, direction, or depth of the well.

4. A method as claimed in claim 1, wherein the plurality of geophysical receivers are located at or near a first depth and the plurality of geophysical sources are located at or near a second depth.

5. A method as claimed in claim 4, wherein the plurality of geophysical receivers are located proximate a sea bed and the plurality of geophysical sources are located proximate a sea surface.

* * * * *